US012689017B2

(12) United States Patent
Mizutani

(10) Patent No.: US 12,689,017 B2
(45) Date of Patent: Jul. 21, 2026

(54) MASS SPECTROMETER

(71) Applicant: SHIMADZU CORPORATION, Kyoto (JP)

(72) Inventor: Shiro Mizutani, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 320 days.

(21) Appl. No.: 18/704,684

(22) PCT Filed: Nov. 8, 2021

(86) PCT No.: PCT/JP2021/041050
§ 371 (c)(1),
(2) Date: Apr. 25, 2024

(87) PCT Pub. No.: WO2023/079761
PCT Pub. Date: May 11, 2023

(65) Prior Publication Data
US 2025/0014885 A1 Jan. 9, 2025

(51) Int. Cl.
*H01J 49/42* (2006.01)

(52) U.S. Cl.
CPC ................................ *H01J 49/4215* (2013.01)

(58) Field of Classification Search
CPC .................................................. H01J 49/4215
See application file for complete search history.

(56) References Cited

U.S. PATENT DOCUMENTS 12,505,995 B2 * 12/2025 Mizutani ............. H01J 49/0009
2011/0084690 A1 4/2011 Vandermey

FOREIGN PATENT DOCUMENTS

JP 2002-033075 A 1/2002
JP 2013-507725 A 3/2013

OTHER PUBLICATIONS

Office Action in the counterpart Japanese patent application (2023-557605) (Oct. 1, 2024).
International Search Report for International Patent Application No. PCT/JP2021/041050 dated Dec. 7, 2021.
Written Opinion of the International Searching Authority for International Patent Application No. PCT/JP2021/041050 dated Dec. 7, 2021.

* cited by examiner

*Primary Examiner* — Nicole M Ippolito
(74) *Attorney, Agent, or Firm* — Muir Patent Law, PLLC

(57) ABSTRACT

A mass spectrometer includes a mass filter, a wave-detection unit, a cancellation circuit and a power supply device. The mass filter selects ions having a mass-to-charge ratio corresponding to an applied AC voltage. The wave-detection unit has a plurality of rectifiers each of which includes a rectifying device and which are connected in parallel, and detects the AC voltage applied to the mass filter as a wave-detection voltage. The cancellation circuit cancels an offset of the AC voltage caused by a leakage current of the rectifying device. The power supply device applies the AC voltage the offset of which has been canceled by the cancellation circuit to the mass filter based on the wave-detection voltage.

7 Claims, 15 Drawing Sheets

INVENTIVE EXAMPLE 1 (TWO RECTIFIERS)

INVENTIVE EXAMPLE 3 (FOUR RECTIFIERS)

MASS SPECTROMETER

TECHNICAL FIELD

The present invention relates to a mass spectrometer.

BACKGROUND ART

A mass spectrometer is known as an analysis device that analyzes the mass of a component included in a sample. For example, in a quadrupole mass spectrometer described in Patent Document 1, various ions generated from a sample by an ion source are introduced into a quadrupole filter. A high-frequency voltage and a DC voltage are applied to four rod electrodes of the quadrupole filter by a quadrupole power supply. Only ions having a particular mass-to-charge ratio selectively pass through the quadrupole filter and are detected by the detector. The mass-to-charge ratio of ions passing through the quadrupole filter depends on a high-frequency voltage and a DC voltage applied to each rod electrode.

In the quadrupole power supply, a high-frequency voltage applied to each rod electrode is converted into a wave-detection current through a capacitor, and the wave-detection current flows through a rectifying device of a wave detector. The wave-detection current is converted into a DC voltage by flowing through a resistor, and the difference between the converted voltage and a target voltage is fed back. The target voltage is set in correspondence with any mass-to-charge ratio. Therefore, it is possible to sweep a high-frequency voltage applied to each rod electrode and scan the mass-to-charge ratio of ions passing through the quadrupole filter by sweeping a target voltage.

In a case in which a relatively large wave-detection current flows through a rectifying device, a wave-detection voltage is converted into a voltage smaller than a voltage into which the wave-detection voltage is to be originally converted due to a leakage current in the rectifying device, and an output voltage is larger than a target voltage in a feedback circuit. In this case, since the difference between the output voltage and the target voltage is increased in a large range of mass, a mass deviation is generated. As such, in Patent Document 1, an auxiliary wave detector having substantially the same wave detection characteristics as those of the wave detector is provided. A non-linearity error amount of the auxiliary wave detector with respect to a target voltage is calculated, and a wave-detection voltage detected by the wave detector is corrected in accordance with a non-linearity error amount.

[Patent Document 1] JP 2002-33075 A

SUMMARY OF INVENTION

Technical Problem

In a case in which the linearity of a leakage current in the rectifying device is poor, peaks of a mass spectrum may not be appropriately separated in a large range of mass. Therefore, it is not possible to appropriately prevent a mass deviation caused by non-linearity characteristics of the rectifying devices.

An object of the present invention is to provide a mass spectrometer that can prevent a mass deviation caused by non-linearity of a rectifying device.

Solution to Problem

One aspect of the present invention relates to a mass spectrometer that includes a mass filter that selects ions having a mass-to-charge ratio corresponding to an applied AC voltage, a wave-detection unit that has a plurality of rectifiers each of which includes a rectifying device and which are connected in parallel, and detects the AC voltage applied to the mass filter as a wave-detection voltage, a cancellation circuit that cancels an offset of the AC voltage caused by a leakage current of the rectifying device, and a power supply device that applies the AC voltage the offset of which has been canceled by the cancellation circuit to the mass filter based on the wave-detection voltage.

Advantageous Effects of Invention

With the present invention, it is possible to prevent a mass deviation caused by non-linearity of a rectifying device.

DESCRIPTION OF EMBODIMENTS

(1) Configuration of Mass Spectrometer

Figure 1:
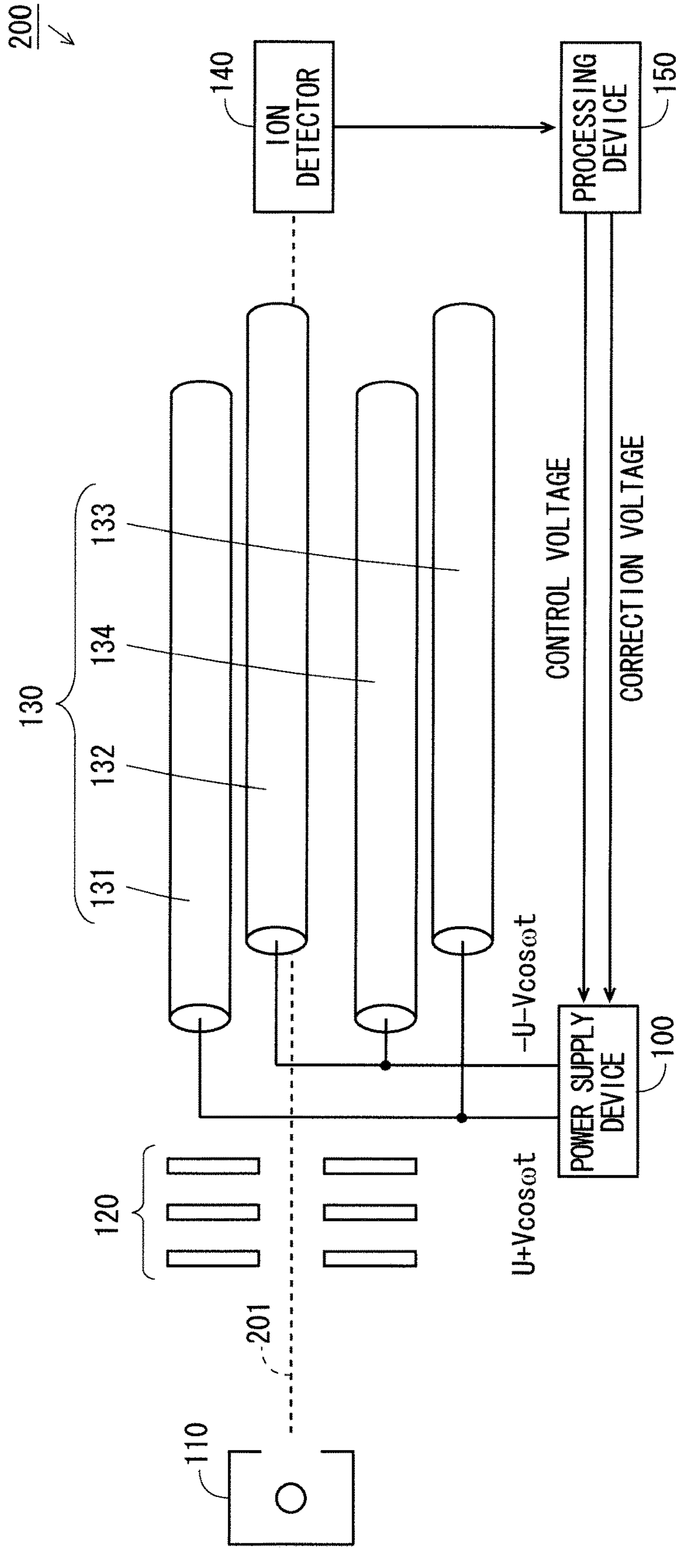
FIG. 1 is a diagram showing the configuration of a mass spectrometer according to one embodiment of the present invention.

A mass spectrometer according to embodiments of the present invention will be described below in detail with reference to the drawings. FIG. 1 is a diagram showing the configuration of a mass spectrometer according to one embodiment of the present invention. As shown in FIG. 1, the mass spectrometer 200 includes a power supply device 100, an ion source 110, an ion transporter 120, a quadrupole mass filter 130, an ion detector 140 and a processing device 150.

The ion source 110 includes a light source in an ultraviolet region, for example, and generates ions of various types of components included in a sample by irradiating a sample to be analyzed with pulsed light. The ion transporter 120 includes an ion lens, for example, and introduces ions generated by the ion source 110 into the quadrupole mass filter 130 along an ion optical axis 201 indicated by the dotted line while converging the ions.

The quadrupole mass filter 130 includes four rod electrodes 131 to 134. The rod electrodes 131 to 134 are arranged in parallel to one another so as to be inscribed in a virtual cylinder centered at the ion optical axis 201. Therefore, the rod electrode 131 and the rod electrode 133 are opposite to each other with the ion optical axis 201 therebetween. The rod electrode 132 and the rod electrode 134 are opposite to each other with the ion optical axis 201 therebetween.

The power supply device 100 applies a summed voltage (U+V cos ωt) which is obtained when a DC voltage U is added to a high-frequency voltage V cos ωt to the rod electrodes 131, 133. Further, the power supply device 100 applies a summed voltage (−U−V cos ωt) which is obtained when a DC voltage−U is added to a high-frequency voltage−V cos ωt to the rod electrodes 132, 134. Thus, among the ions introduced into the quadrupole mass filter 130, only the ions having a specific mass-to-charge ratio defined based on the DC voltage U and an amplitude V of the high-frequency voltage pass through the quadrupole mass filter 130. The configuration of the power supply device 100 will be described below.

The ion detector 140 includes a secondary electron multiplier, for example. The ion detector 140 detects the ions that have passed through the quadrupole mass filter 130 and outputs a detection signal indicating a detection amount to the processing device 150.

The processing device 150 includes a CPU (Central Processing Unit), for example, and is realized by an information processing apparatus such as a personal computer. The processing device 150 controls the operations of the power supply device 100, the ion transporter 120, the quadrupole mass filter 130 and the ion detector 140. Further, the processing device 150 processes the detection signal output by the ion detector 140 to generate a mass spectrum representing the relationship between the mass-to-charge ratio of ions and the detection amount.

(2) Configuration of Power Supply Device

Figure 2:
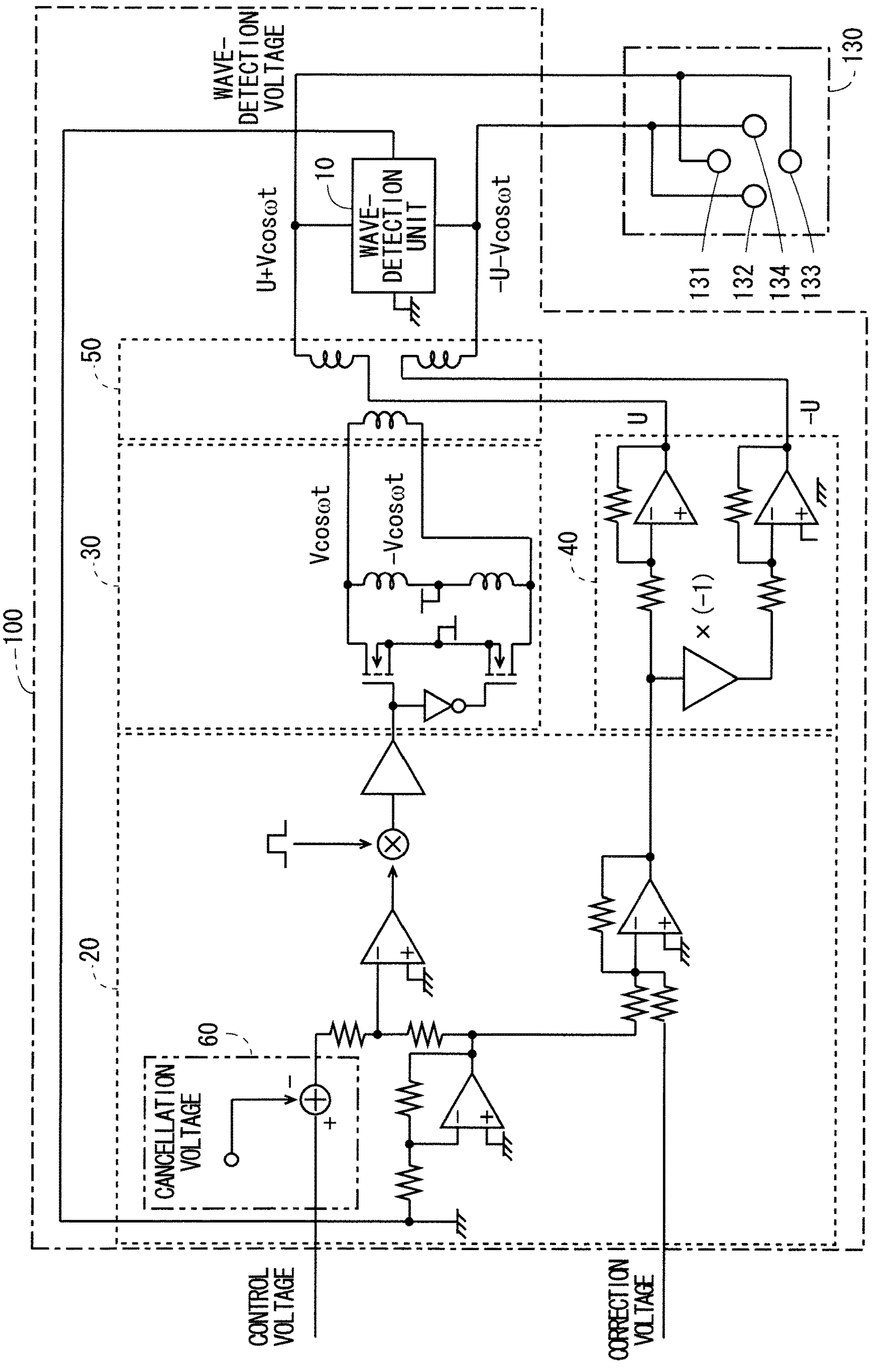
FIG. 2 is a diagram showing the configuration of a power supply device of FIG. 1.

FIG. 2 is a diagram showing the configuration of the power supply device 100 of FIG. 1. As shown in FIG. 2, the power supply device 100 includes a wave-detection unit 10, a voltage controller 20, a high-frequency voltage generator 30, a DC voltage generator 40 and an adder 50. Each of the voltage controller 20, the high-frequency voltage generator 30 and the DC voltage generator 40 includes a circuit element such as an electrical resistor, a coil, a capacitor, an operational amplifier or a logic circuit. The adder 50 includes a transformer.

A control voltage and a correction voltage are supplied to the voltage controller 20 by the processing device 150 of FIG. 1, and a wave-detection voltage is fed back to the voltage controller 20 from the wave-detection unit 10. A control voltage is a voltage for controlling a high-frequency voltage applied to the quadrupole mass filter 130 such that the high-frequency voltage coincides with any target voltage. A correction voltage is a voltage for correcting mass resolution of mass-to-charge ratio. A wave-detection voltage to be fed back by the wave-detection unit 10 will be described below.

The voltage controller 20 includes a cancellation circuit 60. The cancellation circuit 60 adds a cancellation voltage for canceling a deviation (hereinafter referred to as an offset) between a high-frequency voltage and a target voltage caused by a leakage current in the rectifying devices D1 to D4 to a control voltage. Details of the cancellation circuit 60 will be described below. Further, the voltage controller 20 suitably performs various processes such as comparison, modulation, amplification and addition on a control voltage, a correction voltage and a wave-detection voltage to generate voltages of two systems, and supplies the voltages to the high-frequency voltage generator 30 and the DC voltage generator 40.

The high-frequency voltage generator 30 generates high-frequency voltages±V cos ωt having phases different from each other by 180° based on the voltage supplied by the voltage controller 20. The DC voltage generator 40 generates DC voltages±U having different polarities based on the voltage supplied by the voltage controller 20.

The adder 50 includes a transformer. The adder 50 adds the high-frequency voltages generated by the high-frequency voltage generator 30 to the DC voltages generated by the DC voltage generator 40, thereby generating a voltage U+V cos ωt and a voltage−U−V cos ωt. Further, the adder 50 applies the generated voltage U+V cos ωt from one output terminal of a secondary coil to the rod electrodes 131, 133 of the quadrupole mass filter 130. The adder 50 applies the generated voltage−U−V cos ωt from the other output terminal of the secondary coil to the rod electrodes 132, 134 of the quadrupole mass filter 130.

(3) Wave-Detection Unit

Figure 3:
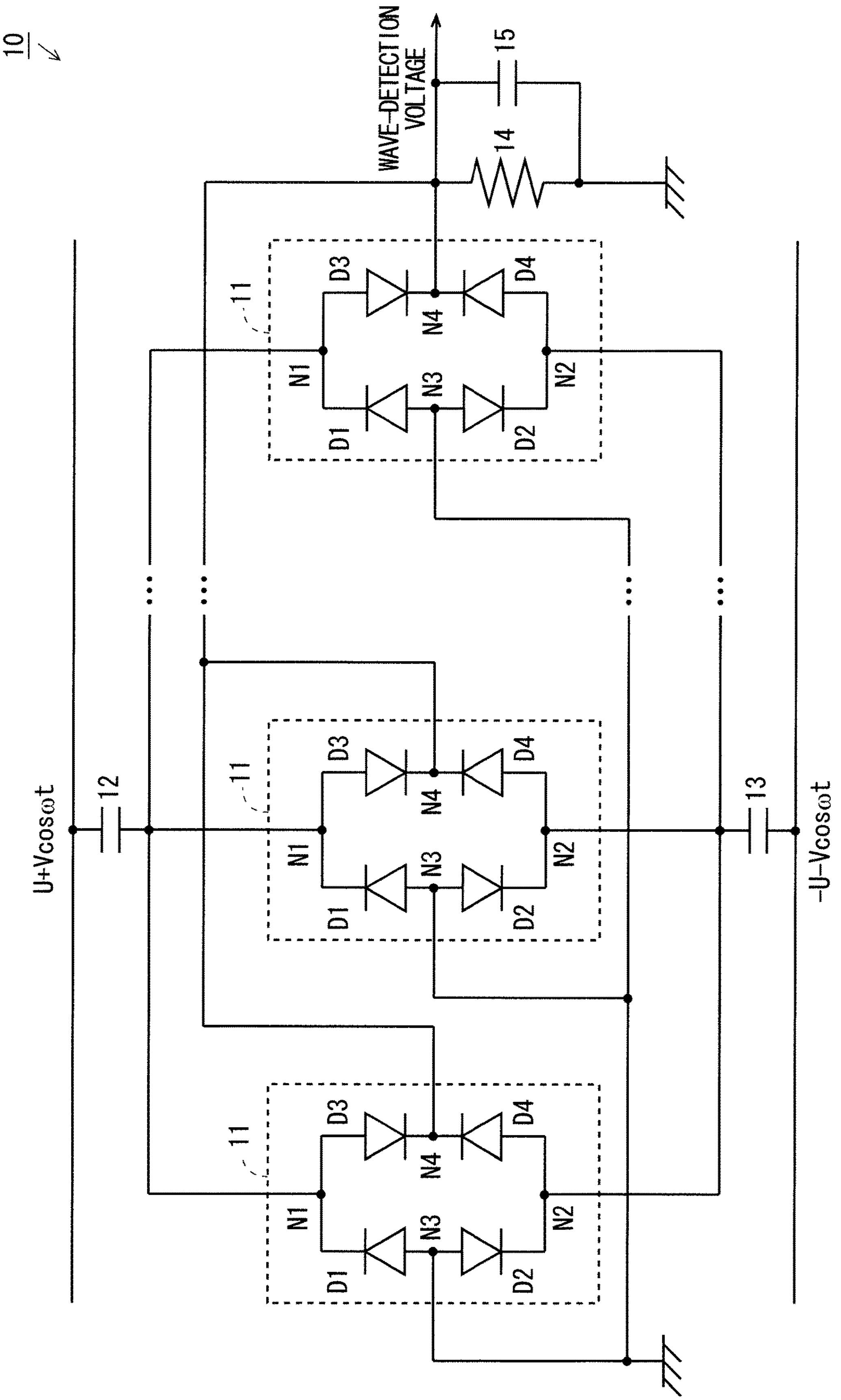
FIG. 3 is a diagram showing the configuration of a wave-detection unit of FIG. 2.

The wave-detection unit 10 is connected between the output terminals of the secondary coil of the adder 50, and converts a high-frequency voltage output from the adder 50 into a wave-detection voltage. FIG. 3 is a diagram showing the configuration of the wave-detection unit 10 of FIG. 2. As shown in FIG. 3, the wave-detection unit 10 includes a plurality of rectifiers 11, wave-detection capacitors 12, 13, a detection resistor 14 and a smoothing capacitor 15.

Each rectifier 11 includes four rectifying devices D1 to D4. The rectifying devices D1 to D4 are respectively high-speed diodes or Schottky barrier diodes, for example. A cathode and an anode of the rectifying device D1 are connected to nodes N1, N3, respectively. A cathode and an anode of the rectifying device D2 are connected to a node N2 and the node N3, respectively. A cathode and an anode of the rectifying device D3 are connected to a node N4 and the node N1, respectively. A cathode and an anode of the rectifying device D4 are connected to the nodes N4, N2, respectively.

The plurality of rectifiers 11 are connected in parallel. Specifically, the nodes N1 of the plurality of rectifiers 11 are connected to one another, and the nodes N2 of the plurality of rectifiers 11 are connected to one another. Further, the nodes N3 of the plurality of rectifiers 11 are connected to one another, and the nodes N4 of the plurality of rectifiers 11 are connected to one another. The nodes N3 of the plurality of rectifiers 11 are connected to a ground terminal. As long as being equal to or larger than two, the number of the rectifiers 11 provided in the wave-detection unit 10 is not limited in particular.

The wave-detection capacitors 12, 13 are ceramic capacitors, for example. The wave-detection capacitor 12 is connected between one output terminal of the adder 50 (FIG. 2) that outputs the voltage U+V cos ωt and the nodes N1 of the plurality of rectifiers 11. The wave-detection capacitor 13 is connected between the other output terminal of the adder 50 that outputs the voltage−U−V cos ωt and the nodes N2 of the plurality of rectifiers 11. The detection resistor 14 and the smoothing capacitor 15 are connected in parallel to each other and are connected between the nodes N4 of the plurality of rectifiers 11 and the ground terminal.

With the above-mentioned configuration, a high-frequency voltage output from the output terminal of the adder 50 is converted into a wave-detection current by the wave-detection capacitor 12 or the wave-detection capacitor 13, and is rectified by flowing through the plurality of rectifiers 11. The rectified current flows through the detection resistor 14 to be converted into a wave-detection voltage and is fed back to the voltage controller 20 of FIG. 2.

(4) Cancellation Voltage Applier

Figure 4:
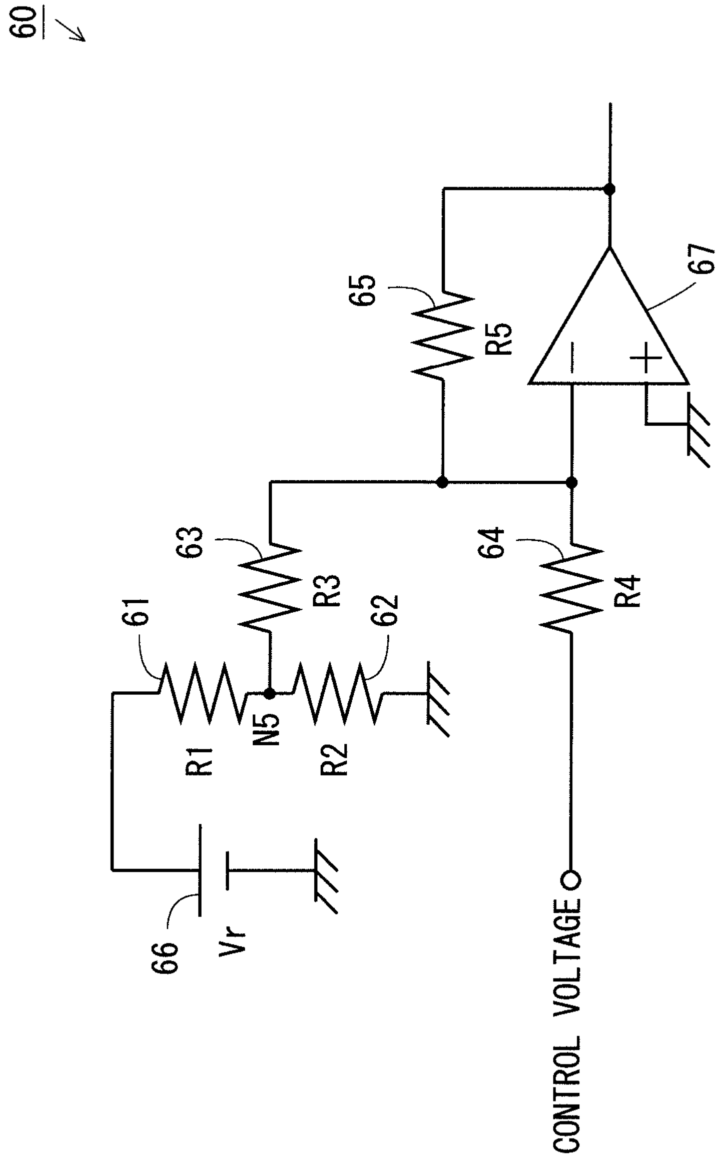
FIG. 4 is a diagram showing the configuration of a cancellation circuit of FIG. 2.

FIG. 4 is a diagram showing the configuration of the cancellation circuit 60 of FIG. 2. As shown in FIG. 4, the cancellation circuit 60 includes resistance devices 61 to 65, a reference power supply 66 and an operational amplifier 67. The resistance values of the resistance devices 61 to 65 are R1 to R5, respectively. The reference power supply 66 is a DC power supply that generates a reference voltage Vr.

The resistance device 61 is connected between a positive electrode of the reference power supply 66 and a node N5. The resistance device 62 is connected between the node N5 and the ground terminal. The resistance device 63 is connected between the node N5 and an inverting input terminal of the operational amplifier 67. The resistance device 64 is connected between an input terminal of a control voltage and the inverting input terminal of the operational amplifier 67. The resistance device 65 is connected between the inverting input terminal and an output terminal of the operational amplifier 67. A negative electrode of the reference power supply 66 and a non-inverting input terminal of the operational amplifier 67 are connected to the ground terminal.

With this configuration, the reference voltage Vr generated by the reference power supply 66 is divided in accordance with the ratio between a resistance value R1 and a resistance value R2, and is applied to the node N5 as a cancellation voltage. Further, a cancellation voltage is added to a control voltage by the operational amplifier 67. Therefore, the operational amplifier 67 is an example of an adder that adds a control voltage to a cancellation voltage and outputs the sum.

The ratio between a cancellation voltage and a control voltage in regard to a voltage output by the operational amplifier 67 is equal to the ratio between a reciprocal of the resistance value R3 and a reciprocal of the resistance value R4. The resistance values R1 to R5 and the reference voltage Vr are defined in advance such that a cancellation voltage can cancel an offset of high-frequency voltage.

For example, suppose that a deviation of an actual measurement value from a theoretical value of any mass-to-charge ratio is 1(u). Further, suppose that a mass-to-charge ratio is 2000 when a control voltage is 9.16 V. In this case, the resistance values R1 to R5 and the reference voltage Vr are defined such that a cancellation voltage of about 9.16 V/2000=4.58 mV is added to the control voltage. As an example, when R1=100 kΩ, R2=3.3 kΩ, R3=100 kΩ, R4=1 kΩ, R5=1 kΩ and Vr=−15 V, a cancellation voltage is 4.79 mV. The offset of high frequency voltage can be canceled by this cancellation voltage.

(5) Comparative Example and Inventive Examples (a) Wave-Detection Unit

Figure 5:
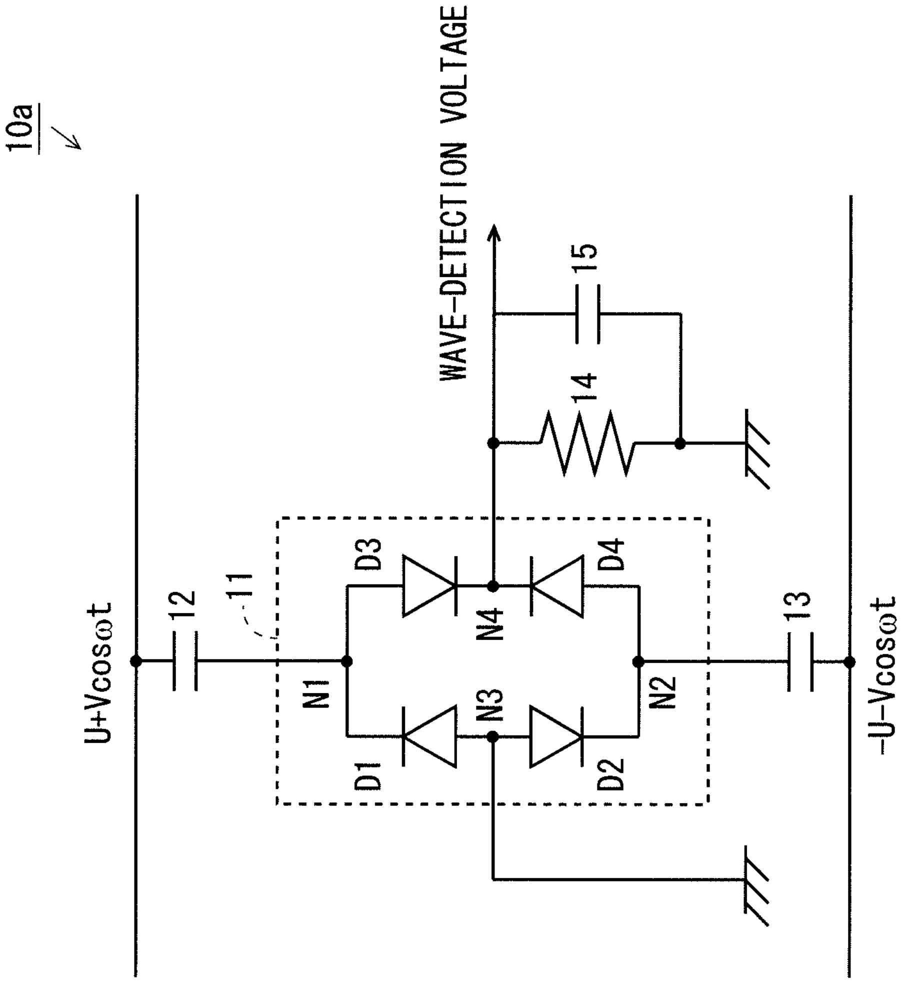
FIG. 5 is a diagram showing the configuration of a wave-detection unit in a reference embodiment.

FIG. 5 is a diagram showing the configuration of a wave-detection unit in a reference embodiment. As shown in FIG. 5, a wave-detection unit 10*a* in the reference embodiment has the configuration similar to that of the wave-detection unit 10 of FIG. 3 except that the wave-detection unit 10*a* includes one rectifier 11 instead of a plurality of rectifiers 11. In a comparative example 1, a mass spectrum was measured using the wave-detection unit 10*a* in the reference embodiment of FIG. 5.

Further, in an inventive example 1, a mass spectrum was measured using a wave-detection unit 10 including two rectifiers 11 connected in parallel. Further, in an inventive example 2, a mass spectrum was measured using a wave-detection unit 10 including three rectifiers 11 connected in parallel. Further, in an inventive example 3, a mass spectrum was measured using a wave-detection unit 10 including four rectifiers 11 connected in parallel. Note that in the comparative example 1 and the inventive examples 1 to 3, rectifying devices D1 to D4 having relatively poor linearity were used. Here, poor linearity means that, in a case in which the magnitude of a wave-detection current equal to or larger than a predetermined value flows through the rectifying devices D1 to D4, the magnitude of a leakage current flowing through the rectifying devices D1 to D4 rapidly is increased.

Figure 6:
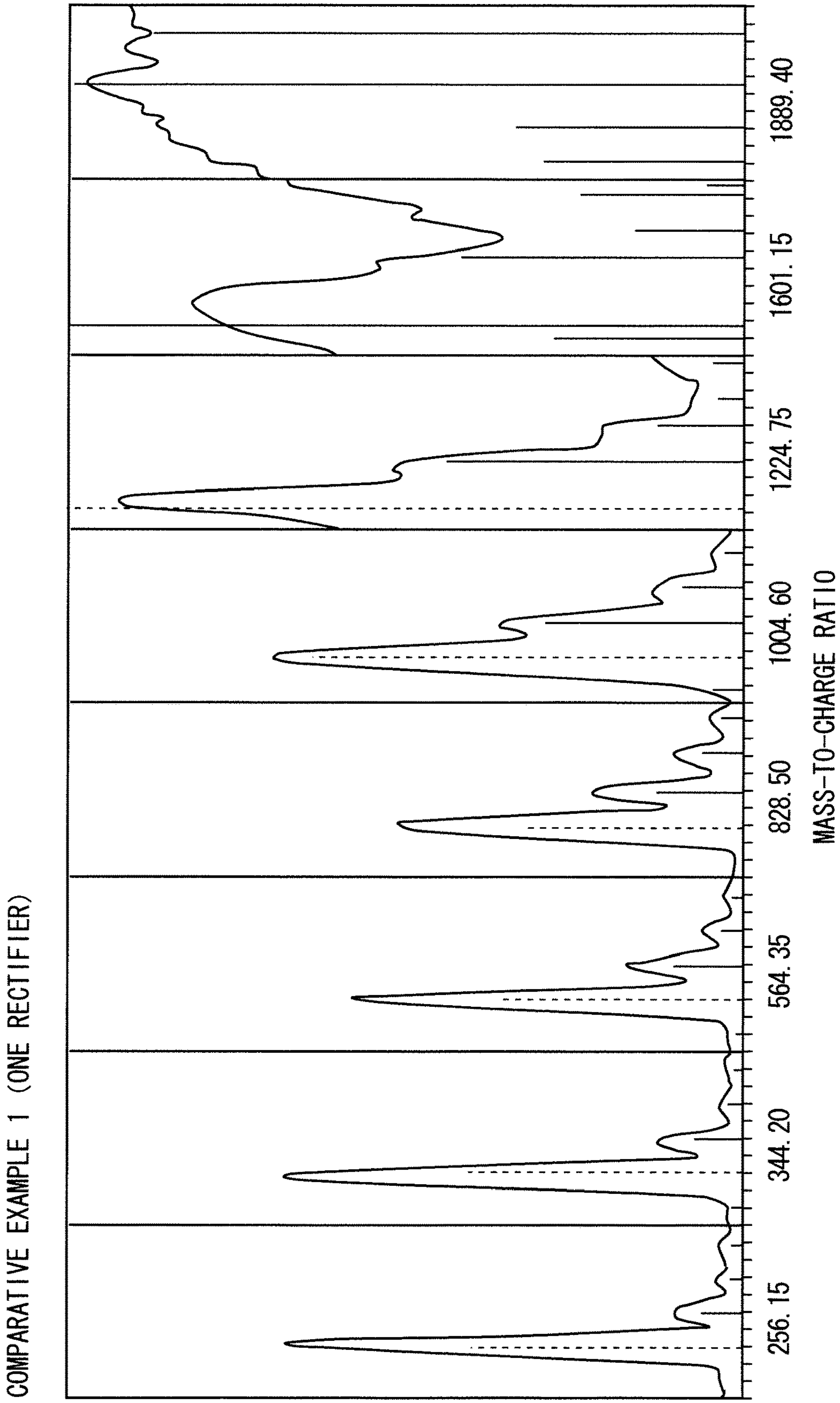
FIG. 6 is a diagram showing a mass spectrum in a comparative example 1.
Figure 7:
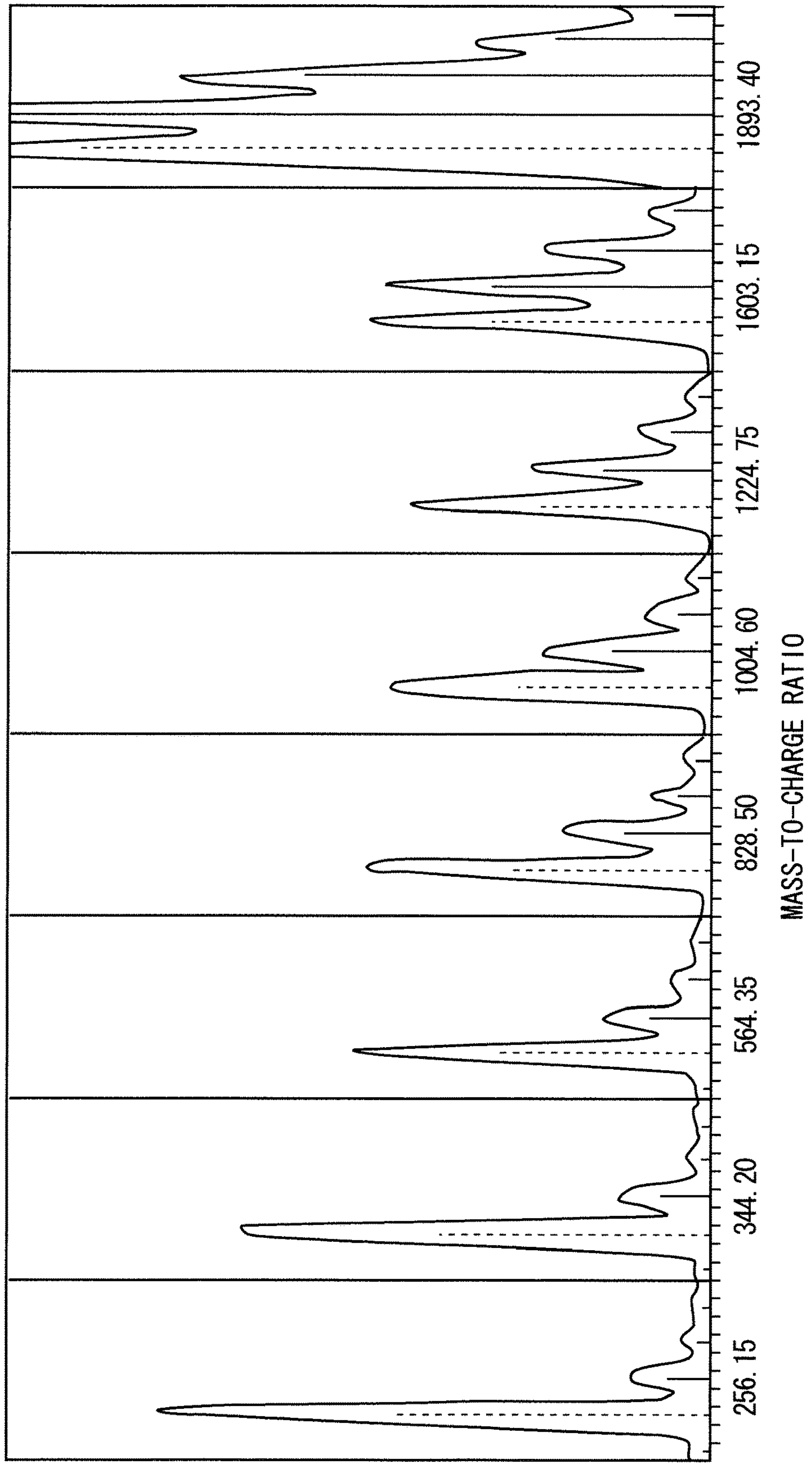
FIG. 7 is a diagram showing a mass spectrum in an inventive example 1.
Figure 8:
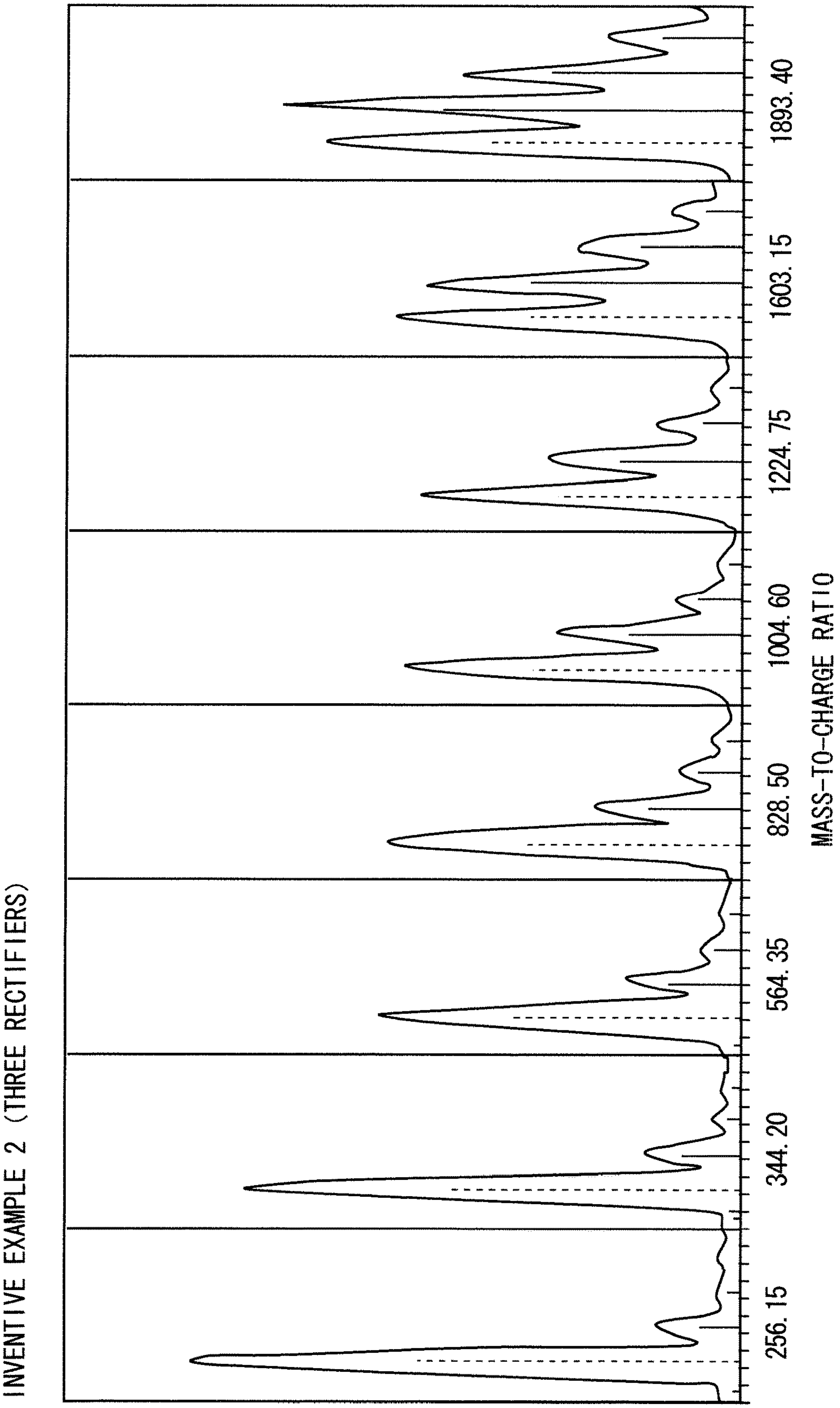
FIG. 8 is a diagram showing a mass spectrum in an inventive example 2.
Figure 9:
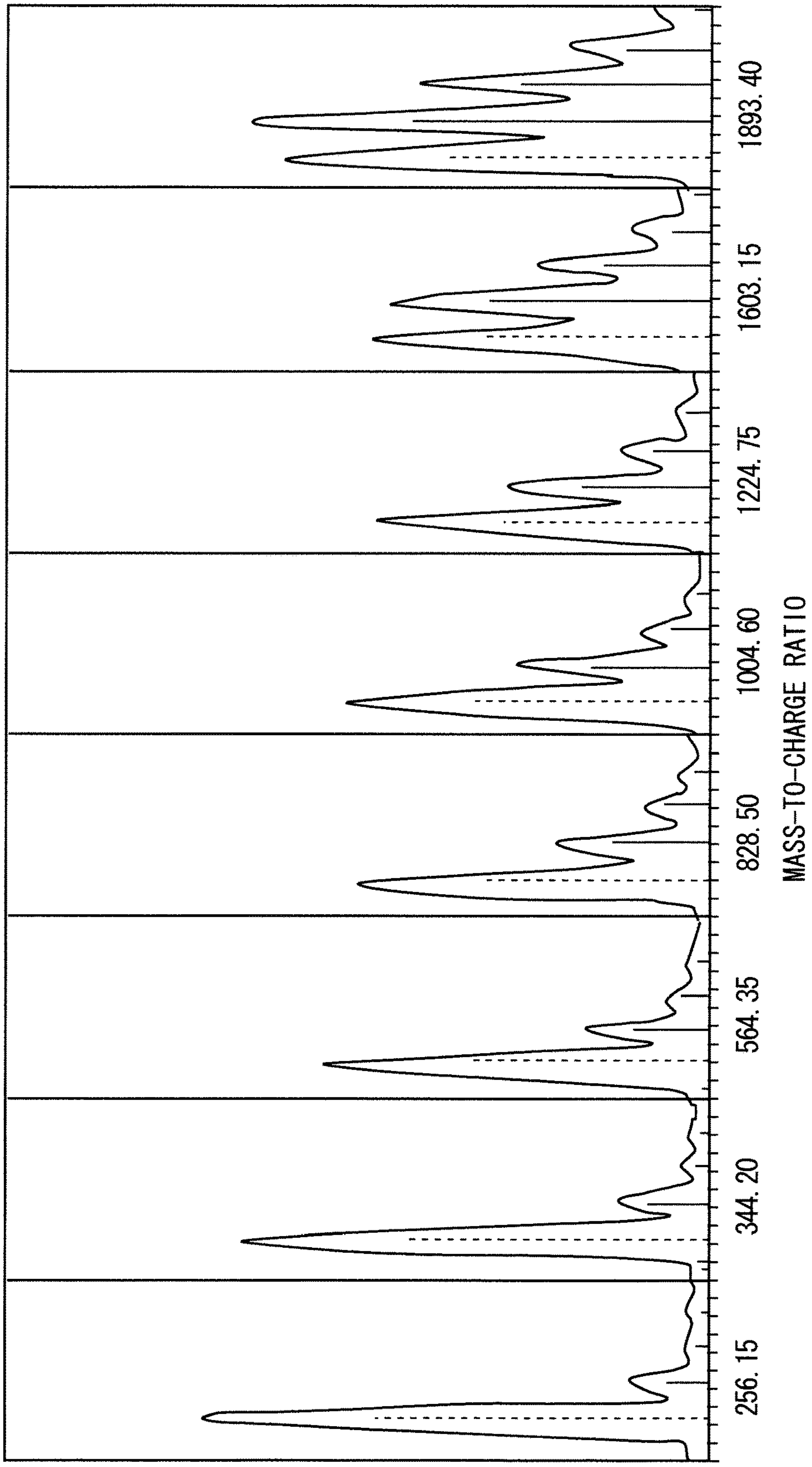
FIG. 9 is a diagram showing a mass spectrum in an inventive example 3.

FIG. 6 is a diagram showing a mass spectrum in the comparative example 1. FIG. 7 is a diagram showing a mass spectrum in the inventive example 1. FIG. 8 is a diagram showing a mass spectrum in the inventive example 2. FIG. 9 is a diagram showing a mass spectrum in the inventive example 3.

In the mass spectrum of each of FIGS. 6 to 9, peaks in the vicinity of a plurality of specific mass-to-charge ratios are displayed in a magnified manner. The magnification ratios for the plurality of peaks are different from one another. The deviation between a peak position corresponding to the dotted line in each frame of a mass spectrum and the center position on the abscissa in the frame indicates an offset of high-frequency voltage. Note that the scale interval on the abscissa in each mass spectrum of each of FIGS. 6 to 9 is 0.5(u). In each of FIGS. 10 to 13, described below, the scale interval on the abscissa is 1(u).

As shown in FIG. 6, in the comparative example 1, in the range in which the mass-to-charge ratio is larger than 1004.60, the widths of peaks are increased. Further, in a range in which the mass-to-charge ratio is larger than 1601.15, each peak is not separated from other peaks. As shown in FIG. 7, in the inventive example 1, although the widths of peaks in the vicinity of the mass-to-charge ratio of 1893.40 are increased, each peak is separated from other peaks. As shown in FIGS. 8 and 9, in the inventive examples 2 and 3, the width of each peak is not increased, and each peak is separated from other peaks.

Based on the result of comparison among the comparative example 1 and the inventive examples 1 to 3, it was confirmed that, even in a case in which the linearity of the rectifying devices D1 to D4 was relatively poor, it was possible to separate each peak from other peaks even in a relatively large range of mass-to-charge ratio by connecting the plurality of rectifiers 11 in parallel. On the other hand, it was confirmed that, the larger the number of rectifiers 11 connected in parallel, the larger an offset of high frequency voltage.

(b) Cancellation Circuit

In the comparative examples 2 to 4, the cancellation circuit 60 was not provided in the voltage controller 20, and mass spectra were measured using the wave-detection units 10 respectively similar to those of the inventive examples 1 to 3. Further, in the inventive examples 4 to 6, the cancellation circuit 60 was provided in the voltage controller 20, and mass spectra were measured using the wave-detection units 10 respectively similar to those of the inventive examples 1 to 3. Note that in the comparative examples 2 to 4 and the inventive examples 4 to 6, the rectifying devices D1 to D4 having relatively good linearity were used. Here, good linearity means that the magnitude of a leakage current flowing through the rectifying devices D1 to D4 is substantially constant regardless of the magnitude of a wave-detection current flowing through the rectifying devices D1 to D4.

Figure 10:
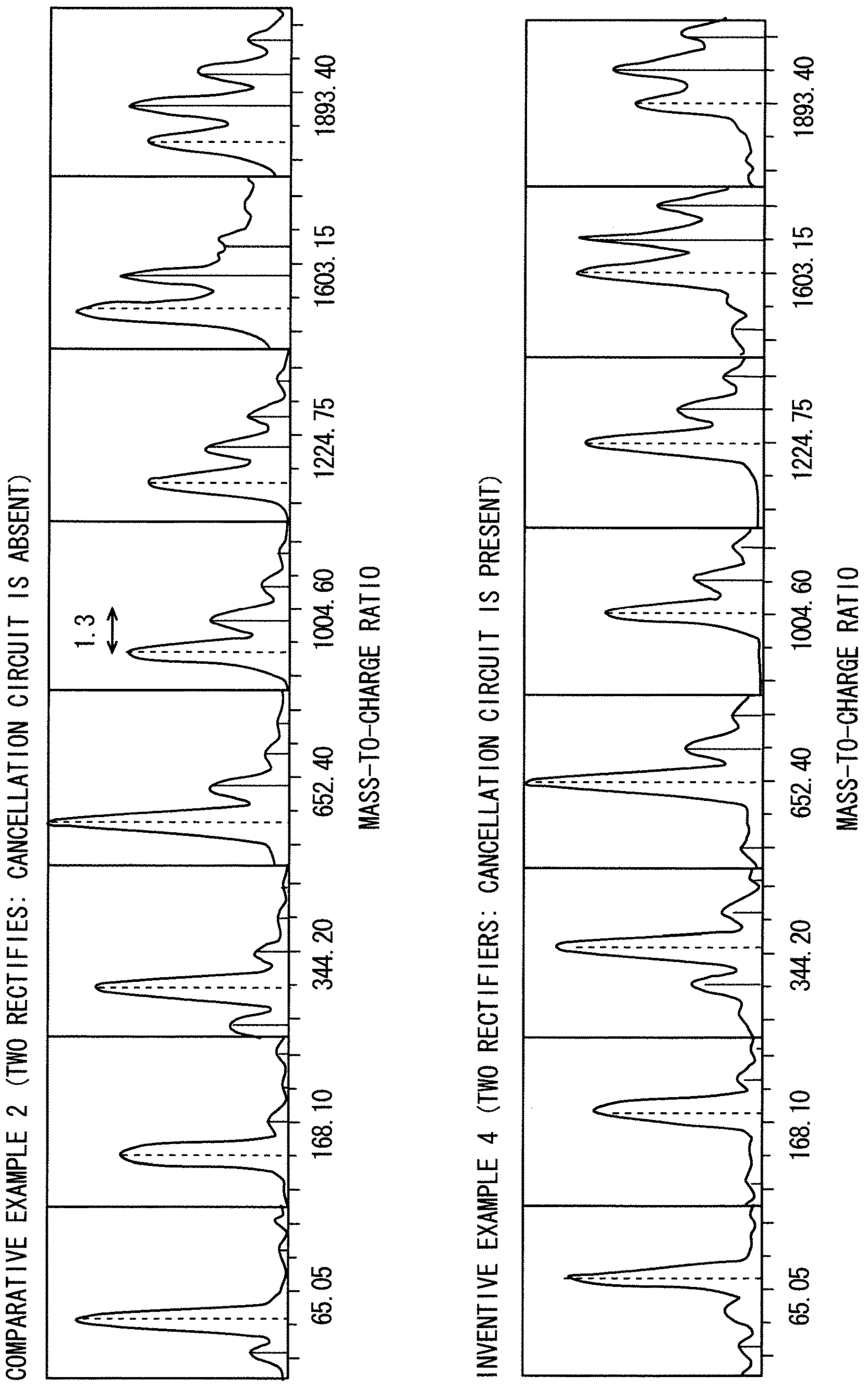
FIG. 10 is a diagram showing mass spectra in a comparative example 2 and an inventive example 4.
Figure 11:
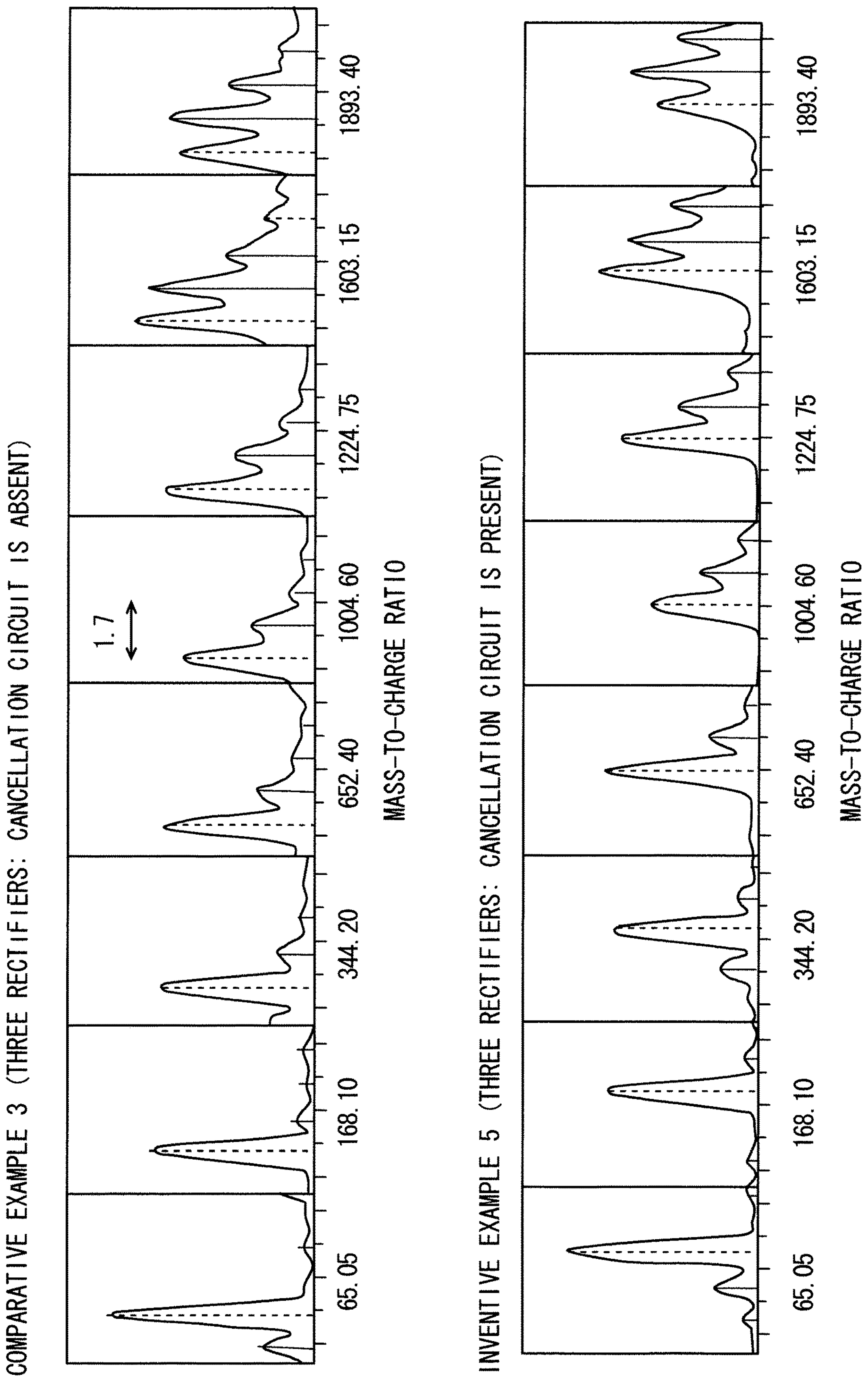
FIG. 11 is a diagram showing mass spectra in a comparative example 3 and an inventive example 5.
Figure 12:
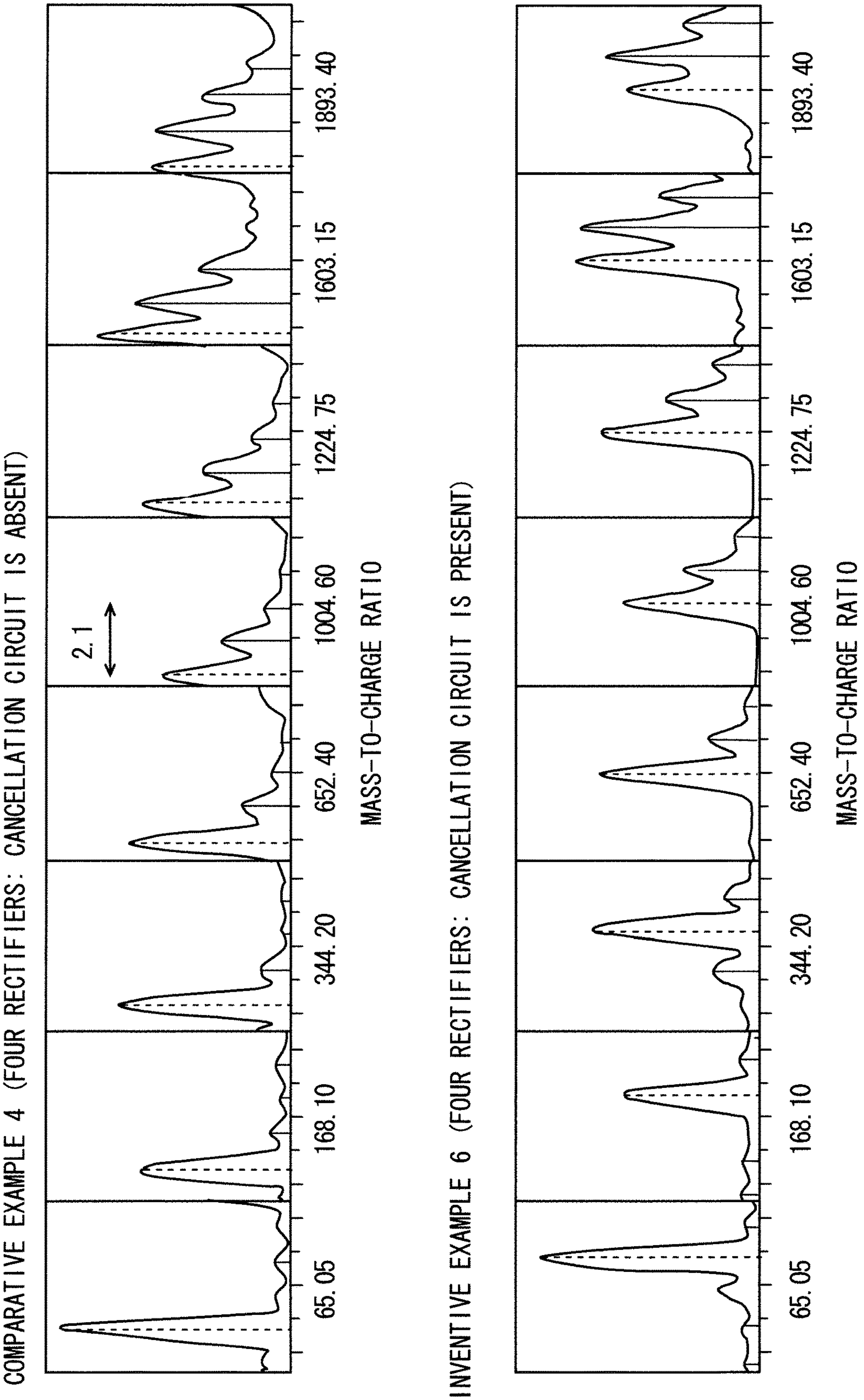
FIG. 12 is a diagram showing mass spectra in a comparative example 4 and an inventive example 6.

FIG. 10 is a diagram showing the mass spectra in the comparative example 2 and the inventive example 4. FIG. 11 is a diagram showing the mass spectra in the comparative example 3 and the inventive example 5. FIG. 12 is a diagram showing the mass spectra in the comparative example 4 and the inventive example 6.

As shown in the upper field of FIG. 10, in the comparative example 2, the peak position of the mass-to-charge ratio of 1004.6 indicated by the dotted line deviates from the center position on the abscissa toward a position of lower mass (leftward) in the frame by about 1.3 (u). Therefore, the deviation between an actual measurement value and a theoretical value of mass-to-charge ratio in the vicinity of the mass-to-charge ratio of 1004.6 is about 1.3 (u). In contrast, as shown in the lower field of FIG. 10, in the inventive example 4, the offset of high frequency voltage corresponding to the deviation of mass-to-charge ratio of about 1.3 (u) is canceled. Therefore, the peak of the mass-to-charge ratio of 1004.6 indicated by the dotted line is located in the vicinity of the center on the abscissa in the frame.

Similarly, as shown in the upper field of FIG. 11, in the comparative example 3, the deviation between an actual measurement value and a theoretical value of mass-to-charge ratio in the vicinity of the mass-to-charge ratio of 1004.6 is about 1.7 (u). In contrast, as shown in the lower field of FIG. 11, in the inventive example 5, the offset of high frequency voltage corresponding to the deviation of mass-to-charge ratio of about 1.7 (u) is canceled. Therefore, the peak of the mass-to-charge ratio of 1004.6 indicated by the dotted line is located in the vicinity of the center on the abscissa in the frame.

As shown in the upper field of FIG. 12, in the comparative example 4, the deviation between an actual measurement value and a theoretical value of mass-to-charge ratio in the vicinity of the mass-to-charge ratio of 1004.6 is about 2.1 (u). In contrast, as shown in the lower field of FIG. 12, in the inventive example 6, the offset of high frequency voltage corresponding to the deviation of mass-to-charge ratio of about 2.1 (u) is canceled. Therefore, the peak of the mass-to-charge ratio of 1004.6 indicated by the dotted line is located in the vicinity of the center on the abscissa in the frame.

Based on the result of comparison among the comparative examples 2 to 4, it was confirmed that, the larger the number of rectifiers 11 connected in parallel, the larger an offset of high frequency voltage. On the other hand, based on the result of comparison among the comparative examples 2 to 4 and the inventive examples 4 to 6, it was confirmed that an offset of high-frequency voltage could be canceled by addition of a cancellation voltage to a control voltage.

(6) Reference Example

In a reference example 1, the cancellation circuit 60 was not provided in the voltage controller 20, and a mass spectrum was measured using the wave-detection unit 10*a* similar to that of the comparative example 1. Further, in a reference example 2, the cancellation circuit 60 was provided in the voltage controller 20, and a mass spectrum was measured using the wave-detection unit 10*a* similar to that of the comparative example 1. Here, in the reference examples 1 and 2, the same rectifying devices D1 to D4 as those of each of the comparative examples 2 to 4 and the inventive examples 4 to 6 were used.

Figure 13:
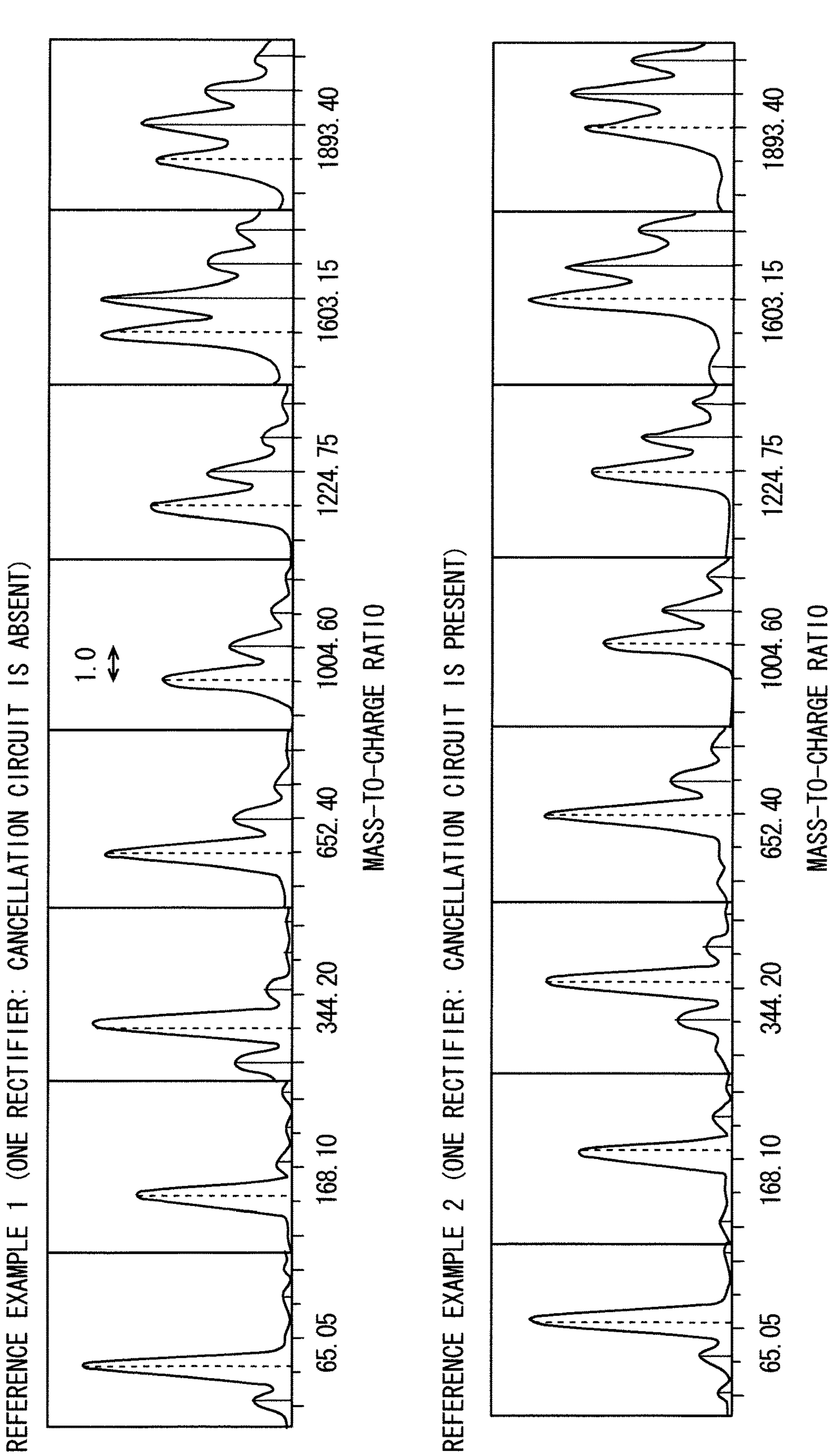
FIG. 13 shows diagrams respectively showing mass spectra in reference examples 1 and 2.

FIG. 13 shows diagrams respectively showing mass spectra in the reference examples 1 and 2. As shown in the upper field of FIG. 13, in the reference example 1, the deviation between an actual measurement value and a theoretical value of mass-to-charge ratio in the vicinity of the mass-to-charge ratio of 1004.6 is about 1.0 (u). In contrast, as shown in the lower field of FIG. 13, in the reference example 2, the offset of high frequency voltage corresponding to the deviation of mass-to-charge ratio of about 1.0 (u) is canceled. Therefore, the peak of the mass-to-charge ratio of 1004.6 indicated by the dotted line is located in the vicinity of the center on the abscissa in the frame.

Based on the result of comparison between the reference examples 1 and 2, it was confirmed that an offset of high-frequency voltage can be canceled by addition of a cancellation voltage to a control voltage.

(7) Effects

In the mass spectrometer 200 according to the present embodiment, ions having a mass-to-charge ratio corresponding to an applied high frequency voltage are selected by the quadrupole mass filter 130. A high frequency voltage applied to the quadrupole mass filter 130 is detected as a wave-detection voltage by the wave-detection unit 10 that has the plurality of rectifiers 11 respectively including the rectifying devices D1 to D4 and being connected in parallel. An offset of high frequency voltage caused by a leakage current of the rectifying devices D1 to D4 is canceled by the cancellation circuit 60. Based on a wave-detection voltage, a high frequency voltage the offset of which is canceled by the cancellation circuit 60 is applied by the power supply device 100 to the quadrupole mass filter 130.

With the mass spectrometer 200, even in a case in which the linear operation range of the rectifying device D1 to D4 of each rectifier 11 is not so wide, overall linearity in the wave-detection unit 10 is improved by electrical connection of the plurality of rectifiers 11 in parallel. Thus, also in a relatively large range of mass-to-charge ratio, it is possible to appropriately separate ions for each mass-to-charge ratio.

Here, the larger the number of rectifiers 11 connected in parallel, the larger an offset of high frequency voltage caused by a leakage current of the rectifying devices D1 to D4. Even in such a case, an offset of high frequency voltage caused by a leakage current of the rectifying devices D1 to D4 is canceled by the cancellation circuit 60. As a result, it is possible to prevent a deviation of mass-to-charge ratio caused by non-linearity of the rectifying devices D1 to D4.

An offset of high-frequency voltage is canceled by addition of a predetermined cancellation voltage to a control voltage that is input for control of a high-frequency voltage. Specifically, the cancellation circuit 60 includes the operational amplifier 67 that adds a control voltage to a cancellation voltage and outputs a summed voltage. Further, the power supply device 100 applies a high frequency voltage to the quadrupole mass filter 130 based on a voltage output by the operational amplifier 67 and a wave-detection voltage. In this case, an offset of high frequency voltage can be canceled with a simple configuration, and a high frequency voltage the offset of which has been canceled can be applied to the quadrupole mass filter 130.

Here, the cancellation voltage is defined in advance so as to cancel the deviation between a theoretical value and an actual measurement value with respect to any mass-to-charge ratio of ions. For example, the cancellation voltage is defined in advance to shift the mass-to-charge ratio of ions selected by the quadrupole mass filter 130 by a constant value that is not less than 0.1 (u) and not more than 5 (u). In this case, it is possible to easily define the cancellation voltage for canceling an offset of high frequency voltage.

(8) Modified Example

Figure 14:
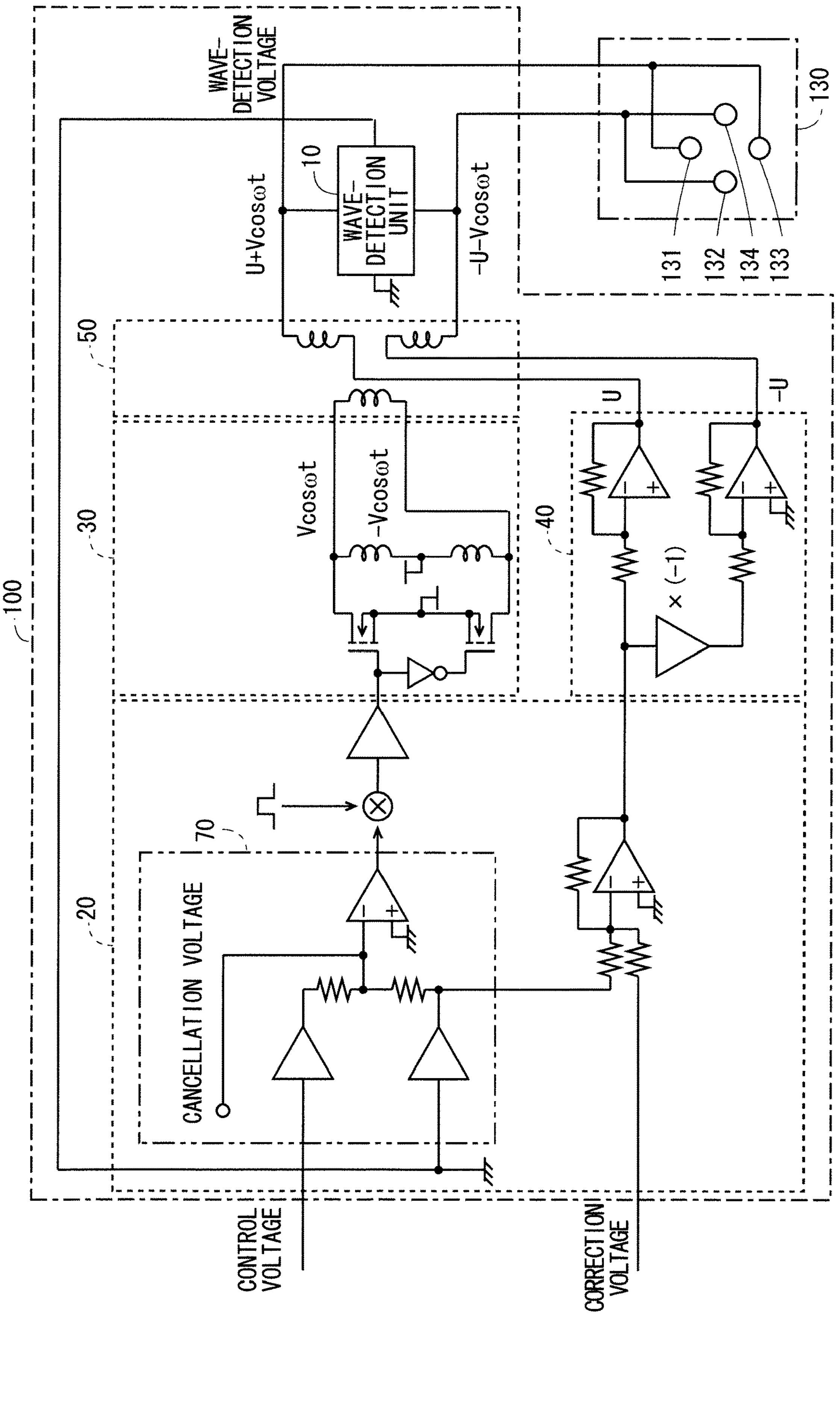
FIG. 14 is a diagram showing the configuration of a power supply device in a modified example.

While a cancellation voltage is added to a control voltage in the power supply device 100 of FIG. 2, the embodiment is not limited to this. FIG. 14 is a diagram showing the configuration of a power supply device 100 in a modified example. As shown in FIG. 14, in the modified example, the cancellation circuit 70 adds a cancellation voltage to a voltage obtained when a control voltage is added to a wave-detection voltage.

Figure 15:
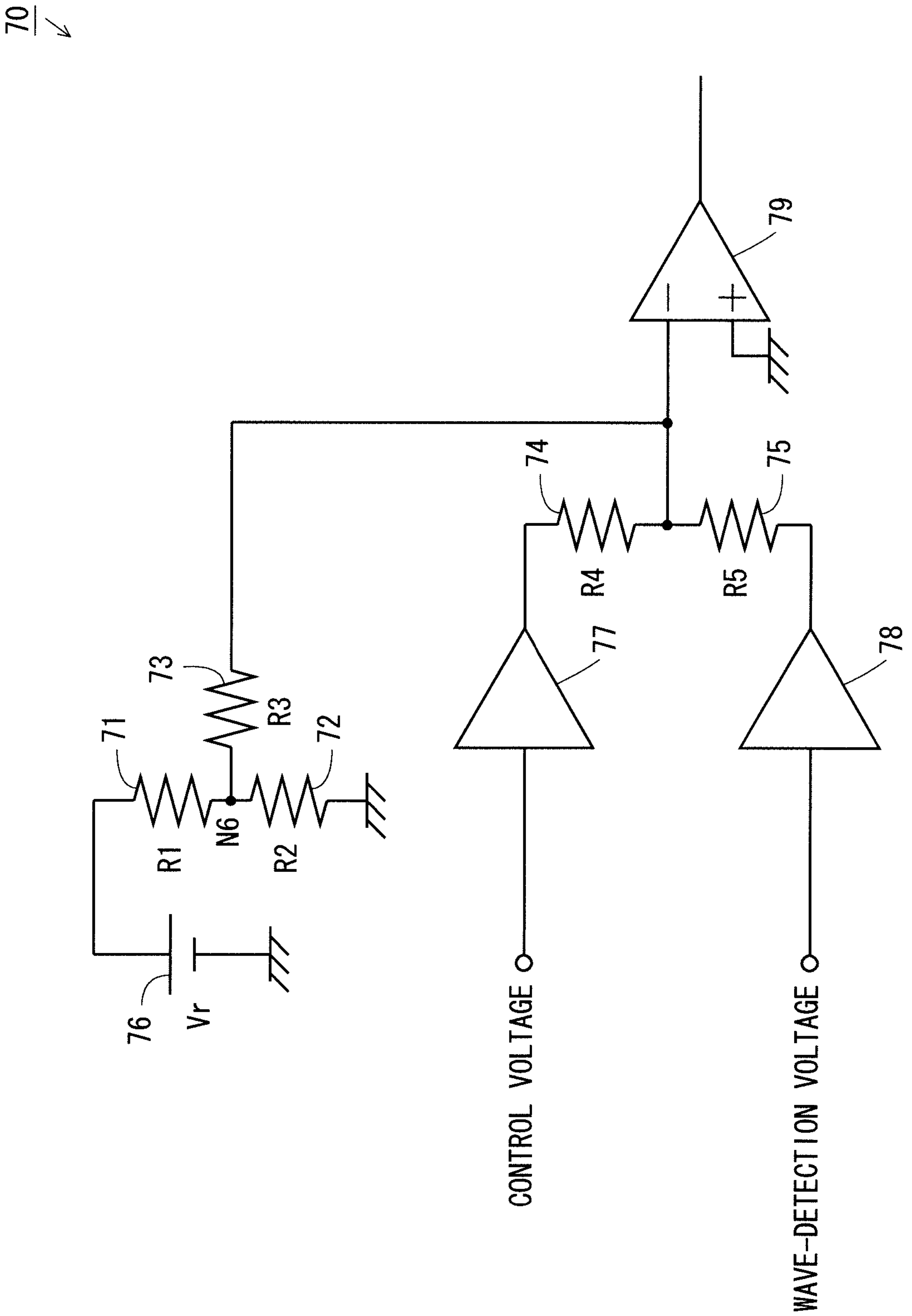
FIG. 15 is a diagram showing the configuration of a cancellation circuit of FIG. 14.

FIG. 15 is a diagram showing the configuration of the cancellation circuit 70 of FIG. 14. As shown in FIG. 15, the cancellation circuit 70 includes resistance devices 71 to 75, a reference power supply 76 and an operational amplifier 77, 78 and an error amplifier 79. The resistance values of the resistance devices 71 to 75 are R1 to R5, respectively. The reference power supply 76 is a DC power supply that generates a reference voltage Vr.

The resistance device 71 is connected between a positive electrode of the reference power supply 76 and a node N6. The resistance device 72 is connected between the node N6 and the ground terminal. The resistance device 73 is connected between the node N6 and an inverting input terminal of the error amplifier 79. The resistance device 74 is connected between an output terminal of the operational amplifier 77 and the inverting input terminal of the error amplifier 79. The resistance device 75 is connected between an output terminal of the operational amplifier 78 and the inverting input terminal of the error amplifier 79.

A negative electrode of the reference power supply 76 is connected to the ground terminal. An input terminal of the operational amplifier 77 is connected to an input terminal of a control voltage. An input terminal of the operational amplifier 78 is connected to an input terminal of a wave-detection voltage. A non-inverting input terminal of the error amplifier 79 is connected to the ground terminal. Note that, the amplification factor of the operational amplifier 77, 78 is 1.

With this configuration, the reference voltage Vr generated by the reference power supply 76 is divided in accordance with the ratio between the resistance value R1 and the resistance value R2, and is applied to the node N6 as a cancellation voltage. Further, the cancellation voltage, the control voltage and the wave-detection voltage are added together by the error amplifier 79. Therefore, the error amplifier 79 is an example of an adder that adds a control voltage, a wave-detection voltage and a cancellation voltage together and output a summed voltage.

The ratio among a cancellation voltage, a control voltage and a wave-detection voltage in regard to a voltage output by the error amplifier 79 is equal to the ratio of the ratio among a reciprocal of the resistance value R3, a reciprocal of the resistance value R4 and a reciprocal of the resistance value R5. The resistance values R1 to R5 and the reference voltage Vr are defined in advance such that an offset of high frequency voltage can be canceled.

As an example, when R1=100 kΩ, R2=3.3 kΩ, R3=1 MΩ, R4=10 kΩ, R5=10 kΩ and Vr=−15 V, the cancellation voltage is 4.79 mV. With this cancellation voltage, it is possible to cancel the offset of high frequency voltage corresponding to a deviation of about 1 (u) of an actual measurement value with respect to a theoretical value of any mass-to-charge ratio.

In this manner, in the modified example, the offset of high-frequency voltage is canceled by addition of a predetermined cancellation voltage to a voltage obtained when a control voltage that is input for control of high frequency voltage is added to a wave-detection voltage. Specifically, the cancellation circuit 70 includes the error amplifier 79 that adds the control voltage, the detection voltage and the cancellation voltage together and outputs a summed voltage. Further, the power supply device 100 applies a high frequency voltage to the quadrupole mass filter 130 based on the voltage output by the error amplifier 79. In this case, an offset of high frequency voltage can be canceled with a simple configuration, and a high frequency voltage the offset of which has been canceled can be applied to the quadrupole mass filter 130.

(9) Other Embodiments

While the wave-detection unit 10 and the cancellation circuits 60, 70 are provided in the power supply device 100 in the above-mentioned embodiment, the embodiment is not limited to this. The wave-detection unit 10 may be provided outside of the power supply device 100. Similarly, part or all of the cancellation circuits 60, 70 may be provided outside of the power supply device 100.

While the node N3 of each rectifier 11 is connected to the ground terminal and the node N4 of each rectifier 11 is connected to the detection resistor 14 and the smoothing capacitor 15 in the above-mentioned embodiment, the embodiment is not limited to this. The node N4 of each rectifier 11 may be connected to the ground terminal, and the node N3 of each rectifier 11 may be connected to the detection resistor 14 and the smoothing capacitor 15.

While the rectifier 11 includes the four rectifying devices D1 to D4 forming a full-wave rectifying circuit in the above-mentioned embodiment, the embodiment is not limited to this. The rectifier 11 may include one rectifying device forming a half-wave rectifying circuit.

(10) Aspects

It is understood by those skilled in the art that the plurality of above-mentioned illustrative embodiments are specific examples of the below-mentioned aspects.

(Item 1) A mass spectrometer according to aspect of the present invention that may include a mass filter that selects ions having a mass-to-charge ratio corresponding to an applied AC voltage, a wave-detection unit that has a plurality of rectifiers each of which includes a rectifying device and which are connected in parallel, and detects the AC voltage applied to the mass filter as a wave-detection voltage, a cancellation circuit that cancels an offset of the AC voltage caused by a leakage current of the rectifying device, and a power supply device that applies the AC voltage the offset of which has been canceled by the cancellation circuit to the mass filter based on the wave-detection voltage.

With the mass spectrometer, even in a case in which the linear operation range of a rectifying device of each rectifier is not so wide, the overall linearity in the wave-detection unit is improved by electrical connection of the plurality of rectifiers in parallel. Thus, also in a relatively large range of mass-to-charge ratio, it is possible to appropriately separate ions for each mass-to-charge ratio.

Here, the larger the number of rectifiers connected in parallel, the larger an offset of AC voltage caused by a leakage current of the rectifying devices. Even in such a case, an offset of AC voltage caused by a leakage current of the rectifying devices is canceled by the cancellation circuit. As a result, it is possible to prevent a deviation of mass-to-charge ratio caused by non-linearity of the rectifying devices.

(Item 2) The mass spectrometer according to item 1, wherein the cancellation circuit may cancel an offset of an AC voltage by adding a predetermined cancellation voltage to a control voltage input for control of the AC voltage.

In this case, an offset of AC voltage can be canceled with a simple configuration.

(Item 3) The mass spectrometer according to item 2, wherein the cancellation circuit may include an adder that adds the control voltage to the cancellation voltage and outputs a summed voltage, and the power supply device may apply an AC voltage to the mass filter based on the voltage that has been output by the adder and the wave-detection voltage.

In this case, an offset of AC voltage can be canceled with a simple configuration, and the AC voltage the offset of which has been canceled can be applied to the mass filter.

(Item 4) The mass spectrometer according to item 1, wherein the cancellation circuit may cancel an offset of an AC voltage by adding a predetermined cancellation voltage to a summed voltage obtained when a control voltage that is input for control of an AC voltage is added to the wave-detection voltage.

In this case, an offset of AC voltage can be canceled with a simple configuration.

(Item 5) The mass spectrometer according to item 4, wherein the cancellation circuit may include an adder that adds the control voltage, the wave-detection voltage and the cancellation voltage together and outputs a summed voltage, and the power supply device may apply an AC voltage to the mass filter based on the voltage that has been output by the adder.

In this case, an offset of AC voltage can be canceled with a simple configuration, and the AC voltage the offset of which has been canceled can be applied to the mass filter.

(Item 6) The mass spectrometer according to any one of items 2 to 5, wherein the cancellation voltage may be defined in advance to cancel a deviation between a theoretical value and an actual measurement value with respect to any mass-to-charge ration of ions.

In this case, it is possible to easily define the cancellation voltage for canceling an offset of AC voltage.

(Item 7) The mass spectrometer according to any one of items 2 to 6, wherein the cancellation voltage may be defined in advance to shift a mass-to-charge ratio of ions selected by the mass filter by a constant value that is not less than 0.1 and not more than 5.

In this case, it is possible to easily define the cancellation voltage for canceling an offset of AC voltage.

The invention claimed is:

1. A mass spectrometer comprising:

a mass filter that selects ions having a mass-to-charge ratio corresponding to an applied AC voltage;

a wave-detection unit that has a plurality of rectifiers each of which includes a rectifying device and which are connected in parallel, and detects the AC voltage applied to the mass filter as a wave-detection voltage;

a cancellation circuit that cancels an offset of the AC voltage caused by a leakage current of the rectifying device; and a power supply device that applies the AC voltage the offset of which has been canceled by the cancellation circuit to the mass filter based on the wave-detection voltage.

2. The mass spectrometer according to claim 1, wherein the cancellation circuit cancels an offset of an AC voltage by adding a predetermined cancellation voltage to a control voltage input for control of the AC voltage.

3. The mass spectrometer according to claim 2, wherein the cancellation circuit includes an adder that adds the control voltage to the cancellation voltage and outputs a summed voltage, and the power supply device applies an AC voltage to the mass filter based on the voltage that has been output by the adder and the wave-detection voltage.

4. The mass spectrometer according to claim 2, wherein the cancellation voltage is defined in advance to cancel a deviation between a theoretical value and an actual measurement value with respect to any mass-to-charge ration of ions.

5. The mass spectrometer according to claim 2, wherein the cancellation voltage is defined in advance to shift a mass-to-charge ratio of ions selected by the mass filter by a constant value that is not less than 0.1 and not more than 5.

6. The mass spectrometer according to claim 1, wherein the cancellation circuit cancels an offset of an AC voltage by adding a predetermined cancellation voltage to a summed voltage obtained when a control voltage that is input for control of an AC voltage is added to the wave-detection voltage.

7. The mass spectrometer according to claim 6, wherein the cancellation circuit includes an adder that adds the control voltage, the wave-detection voltage and the cancellation voltage together and outputs a summed voltage, and the power supply device applies an AC voltage to the mass filter based on the voltage that has been output by the adder.

* * * * *